(12) United States Patent
Perera et al.

(10) Patent No.: US 7,529,416 B2
(45) Date of Patent: May 5, 2009

(54) METHOD AND APPARATUS FOR TRANSFERRING DIGITAL DATA BETWEEN CIRCUITS

(75) Inventors: Jane Perera, Saratoga, CA (US); Joseph D. Young, Mountain View, CA (US)

(73) Assignee: Terayon Communication Systems, Inc., Santa Clara, CA (US)

( * ) Notice: Subject to any disclaimer, the term of this patent is extended or adjusted under 35 U.S.C. 154(b) by 256 days.

(21) Appl. No.: 11/506,692

(22) Filed: Aug. 18, 2006

(65) Prior Publication Data

US 2008/0043833 A1    Feb. 21, 2008

(51) Int. Cl.
    G06K 9/36      (2006.01)
(52) U.S. Cl. ...................................... 382/232
(58) Field of Classification Search .................. 382/199, 382/232, 233, 236, 240, 260, 264, 283
    See application file for complete search history.

(56) References Cited

U.S. PATENT DOCUMENTS 6,483,944 B1 * 11/2002 Sugahara et al. ............ 382/232

OTHER PUBLICATIONS

Kim, Minjung et al., "Optimal Dynamic Rate Shaping For Compressed Video Streaming", P. Lorenz Edition: ICN 2001, LNCS 2094, pp. 786-794, 2001, (with Abstract).

"MPEG-2", Wikipedia, the free encyclopedia, downloaded from http://en.wikipedia.org/wiki/MPEG-2 on Jun. 19, 2006, 7 pages.
"MPEG-4", Wikipedia, the free encyclopedia, downloaded from http://en.wikipedia.org/wiki/MPEG-4 on Jun. 19, 2006, 3 pages.
"JPEG", Wikipedia, the free encyclopedia, downloaded from http://en.wikipedia.org/wiki/JPEG on Jun. 12, 2006, 9 pages.
"Run-length encoding", Wikipedia, the free encyclopedia, downloaded from http://en.wikipedia.org/wiki/Run-length encoding, on Jun. 12, 2006, 2 pages.
"Data compression", Wikipedia, the free encyclopedia, downloaded from http://en.wikipedia.org/wiki/Data compression, on Jun. 12, 2006, 4 pages.
International Search Report and Written Opinion, Application No. PCT/US07/17132, dated Sep. 4, 2008.

* cited by examiner

*Primary Examiner*—Duy M Dang
(74) *Attorney, Agent, or Firm*—Nixon Peabody LLP

(57) ABSTRACT

A method and apparatus transfer digital data between a coder/decoder circuit and a signal processor. The transfer of the digital data includes (a) obtaining, at a first circuit, a block of data values having certain statistical characteristics, the first circuit being one of the coder/decoder circuit and the signal processor, (b) generating, at the first circuit, a data stream by encoding the block of data values based on the statistical characteristics thereof, (c) transferring the data stream to a second circuit via a data bus connecting the first circuit and the second circuit, the second circuit being the other of the coder/decoder circuit and the signal processor, and (d) reconstructing, at the second circuit, the block of data values by decoding the data stream received from the first circuit.

23 Claims, 9 Drawing Sheets

8x8 Cb

8x8 Cr

16x16 Luma $$\begin{bmatrix} -415 & -33 & -58 & 35 & 58 & -51 & -15 & -12 \\ 5 & -34 & 49 & 18 & 27 & 1 & -5 & 3 \\ -46 & 14 & 80 & -35 & -50 & 19 & 7 & -18 \\ -53 & 21 & 34 & -20 & 2 & 34 & 36 & 12 \\ 9 & -2 & 9 & -5 & -32 & -15 & 45 & 37 \\ -8 & 15 & -16 & 7 & -8 & 11 & 4 & 7 \\ 19 & -28 & -2 & -26 & -2 & 7 & -44 & -21 \\ 18 & 25 & -12 & -44 & 35 & 48 & -37 & -3 \end{bmatrix}$$

FIG. 2A $$\begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

FIG. 2B $$\begin{bmatrix} -26 & -3 & -6 & 2 & 2 & -1 & 0 & 0 \\ 0 & -3 & -4 & 1 & 1 & 0 & 0 & 0 \\ -3 & 1 & 5 & -1 & -1 & 0 & 0 & 0 \\ -4 & 1 & 2 & -1 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

54 ⟶ 0x e800    16-bit Significance Map
56 ⟶ 0x 01      Codeword ("all coefficients following are 8-bit")
     ┌ 0x 0c    Coefficient
58 ┤  0x 03    Coefficient
     │ 0x 01    Coefficient
     └ 0x 01    Coefficient (60)

```
                                     ~64
1110 1100 0000 0000  (= 0xec00)
```

| | | |
|---|---|---|
| 64 ~ | 0xec00 | 16-bit Significance Map |
| 66 ~ | 0x0c | 8-bit Coefficient |
| 67 ~ | 0x80 | Escape Codeword ("the following coefficient is 16-bit") |
| | 0x01ff | 16-bit Coefficient |
| 66 { | 0x03 | 8-bit Coefficient |
| | 0x01 | 8-bit Coefficient |
| | 0x01 | 8-bit Coefficient |

(0,5)  (0,3)  (1,1)  (0,2)  (1,1)  (EOB)    ← 82

FIG. 8C

METHOD AND APPARATUS FOR TRANSFERRING DIGITAL DATA BETWEEN CIRCUITS

FIELD OF THE INVENTION

The present invention relates to a method and apparatus for transferring digital data between circuits. More particularly, the present invention relates to a method and apparatus for reducing the bit rate of a data stream utilizing certain statistical characteristics or pattern of the data being transferred.

BACKGROUND OF THE INVENTION

Moving pictures (and associated audio) for broadcast signals are typically encoded and compressed in accordance with a standardized coding scheme. For example, MPEG-2, MPEG-4, H.264, and the like, are used for such encoding/compressing. These coding formats are also used to record commercial movies on DVD's, as well as Internet applications such as distance learning, Internet TV broadcasting, video-on-demand systems, and the like.

An MPEG-coded video bitstream includes a series of data frames encoding pictures, including intra frames (I pictures), forward predicted frames (P pictures), and bi-directionally predicted frames (B pictures). The frames are typically arranged in a specified order referred to as the GOP (Group Of Pictures) structure.

The video image is separated into one luminance (Y) channel and two chrominance (Cb and Cr) channels. Blocks of the luminance and chrominance arrays are organized into "macroblocks," which are the basic unit of coding within a picture. Each macroblock is typically divided in to one 16×16 luminance block (four 8×8 blocks) and two 8×8 chrominance blocks. FIG. 1 schematically illustrates such a 16×16 luminance (Luma) block and 8×8 chrominance (Chroma: Cr and Cb) blocks.

Each sample block is encoded using the discrete cosine transform (DCT). The MPEG-2 typically uses 8×8 transform blocks. MPEG-4 typically uses 4×4 transform blocks, or may adaptively select between the 4×4 and 8×8 transform block sizes. The DCT-based encoder is considered as essentially compression of a stream of 8×8 (or 4×4) sample blocks of image samples.

For example, in case of MPEG-2 encoding, each 8×8 block undergoes each processing step, and yields 64 DCT coefficients. For a typical 8×8 sample block from a typical source image, most of the spatial frequencies have zero or near-zero amplitude and need not be encoded. Thus, in principle, the DCT introduces no loss to the source image samples, and it merely transforms the image samples to a special frequency domain in which they can be more efficiently encoded. Each of the resulting DCT coefficients is quantized using a 64-element Quantization Table or quantization matrix. FIGS. 2A-2C illustrate an example of a DCT coefficient matrix, a common quantization matrix, and the resulting quantized coefficient matrix for the 8×8 block size, respectively.

After quantization, entropy encoding is typically applied to the quantized values. For example, the quantized DCT coefficients are scanned using a zig-zag scan order so as to place low-frequency non-zero coefficients before high-frequency coefficients and maximize the probability of long runs of zeros and low amplitude of the subsequent coefficient values. The re-ordered quantized coefficients are then variable-length (or run-length) coded. The DC coefficient, which contains a significant fraction of the total image energy, may be differentially encoded.

In MPEG-4, for example, the context-adaptive binary arithmetic coding (CABAC) may be used to compress the quantized coefficients. The CABAC losslessly compress coefficients (syntax elements) in the video stream knowing the probabilities of syntax elements in a given context. The context-adaptive variable-length coding (CAVLC), which is a lower-complexity alternative to the CABAC, may also be used to encode/compress quantized transform coefficient values.

The encoded/compressed video data is typically further processed and then transmitted via traditional antennas (RF) or the communication network (cables, optical fibers, satellites, the Internet, and the like). The received vide data is decoded/decompressed by a corresponding decoder, for example, a CABAC or CAVLC decoder. If the received video data is to be processed before being displayed, or stored, the decompressed data is sent to a central processing unit (CPU) or a digital signal processor (DSP). Since the video data has already been decompressed, or at least partially decoded, the data rate of the communication between the decoder and the DSP (two processors or processing units) is very high. Thus, such communication of decompressed data requires a considerable bandwidth, and tends to be a bottleneck of the process.

BRIEF DESCRIPTION OF THE INVENTION

A method and apparatus transfer digital data between a coder/decoder circuit and a signal processor. The transfer of the digital data includes (a) obtaining, at a first circuit, a block of data values having certain statistical characteristics, the first circuit being one of the coder/decoder circuit and the signal processor, (b) generating, at the first circuit, a data stream by encoding the block of data values based on the statistical characteristics thereof, (c) transferring the data stream to a second circuit via a data bus connecting the first circuit and the second circuit, the second circuit being the other of the coder/decoder circuit and the signal processor, and (d) reconstructing, at the second circuit, the block of data values by decoding the data stream received from the first circuit.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings:

FIGS. 2A-2C are diagrams schematically illustrating an example of a DCT coefficient matrix, a common quantization matrix, and the resulting quantized coefficient matrix for an 8×8 block, respectively.

FIG. 5A is a diagram illustrating an example of a block of data values (coefficients) in 4×4 block.

FIG. 5B is a diagram illustrating an example of a data series to be compressed in accordance with one embodiment of the present invention.

FIG. 5C is a diagram illustrating an example of a significance map in accordance with one embodiment of the present invention.

FIG. 5D is a diagram illustrating an example of an output data series in accordance with one embodiment of the present invention.

FIG. 6A is a diagram illustrating another example of a block of data values (coefficients) in 4×4 block.

FIG. 6B is a diagram illustrating another example of a data series to be compressed in accordance with one embodiment of the present invention.

FIG. 6C is a diagram illustrating another example of a significance map in accordance with one embodiment of the present invention.

FIG. 6D is a diagram illustrating another example of an output data series in accordance with one embodiment of the present invention.

FIG. 8A is a diagram illustrating an example of a block of data values (coefficients) in 4×4 block.

FIG. 8B is a diagram illustrating an example of a data series to be compressed in accordance with another embodiment of the present invention.

FIG. 8C is a diagram illustrating an example of an output data series in accordance with another embodiment of the present invention.

DETAILED DESCRIPTION

Embodiments of the present invention are described herein in the context of a method and apparatus for transferring digital data between circuits. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that generic central processing units (CPUs), digital signal processors (DSPs), and devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 3:
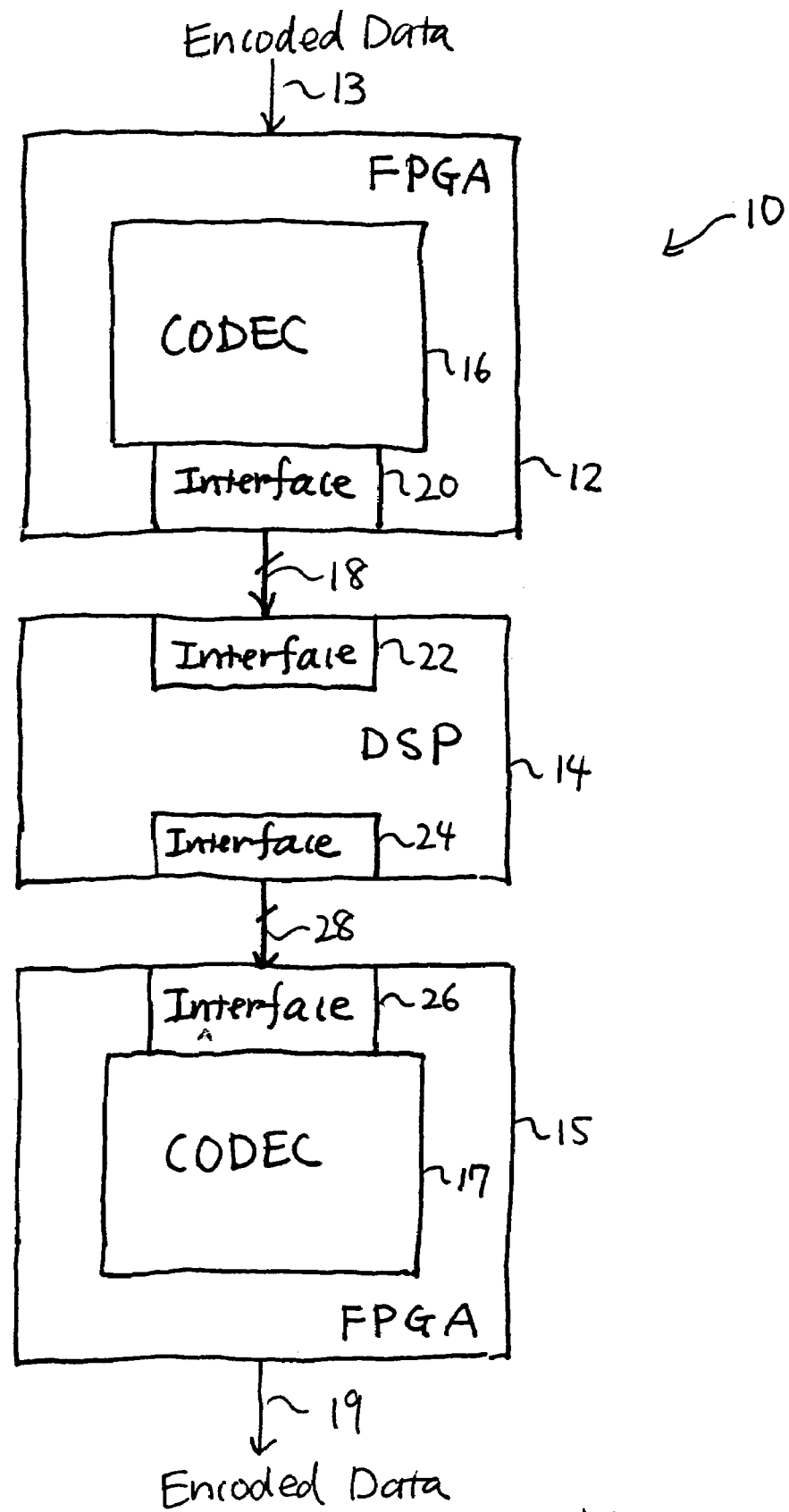
FIG. 3 is a block diagram schematically illustrating a system implementing interface circuits in accordance with one embodiment of the present invention.

FIG. 3 schematically illustrates a system 10 implementing an interface circuit 20 in accordance with one embodiment of the present invention. The system 10 includes a coder/decoder circuit 12 and a digital signal processor (DSP) 14. The coder/decoder circuit 12 may be implemented using a field programmable gate array (FPGA) which includes a coder/decoder (CODEC) 16 such as CABAC, CAVLC, or the like. A generic central processor unit (CPU) may also used in place of DSP 14. In this example, the coder/decoder circuit 12 is a decoder, which receives an encoded data stream 13, for example, an MPEG-coded video data stream, and fully or partially decodes the encoded data stream. The decoded data is transmitted via a data bus 18 to the DSP 14 for processing the decoded data. The coder/decoder circuit 12 and the DSP 14 may be separate IC chips on a circuit board, or may be two separate circuit cores integrated in one chip such as a system-on-a-chip. It should be noted that the present invention is generally applicable to data transfer between two processors on a system, and if an IC chip has multiple processing units, data transfer via an intra-chip bus between such processing units.

The DSP 14 processes the decoded data, for example, to change the display format (size, resolution and/or aspect ratio), to insert or combine additional video data to the original video data, and the like. Thus, the CODEC 16 decodes the received encoded data stream 13 to the level necessary for the DSP 14 to perform the specific signal processing. Since the data is at least partially decoded (i.e., decompressed), the data rate between the coder/decoder circuit 12 and the DSP 14 is significantly high, and thus such a data transmission via the bus 18 may be a bottleneck of the process, especially in the video data display which requires real-time data processing. For example, if a high definition (HD) size frame with 1920× 1080 pixels is transmitted at 30 frames per second, and each pixel has a corresponding 16-bit DCT coefficient, the data rate for the coefficients only would be 1920×1080×16×30× 1.5≈1.5 Gbit/sec (the factor 1.5 is based on the fact that the number of Chroma coefficients are one-half of that of the Luma coefficients).

Accordingly, in accordance with one embodiment of the present invention, interface circuits 20 and 22 are provided to the coder/decoder circuit 12 and DSP 14, respectively, for efficient data transmission via the bus 18. As shown in FIG. 3, the interface circuit 20 may be implemented as part of the coder/decoder circuit 12 (using the FPGA), and the interface circuit 22 may be implemented as part of the DSP 14. The interface circuit 20 encodes/compress the output of the CODEC 16 for data transmission via the bus 18, and the interface circuit 22 receives the data thus encoded/compressed and decodes/decompresses to restore the original output from the CODEC 16 for signal processing.

Figure 4:
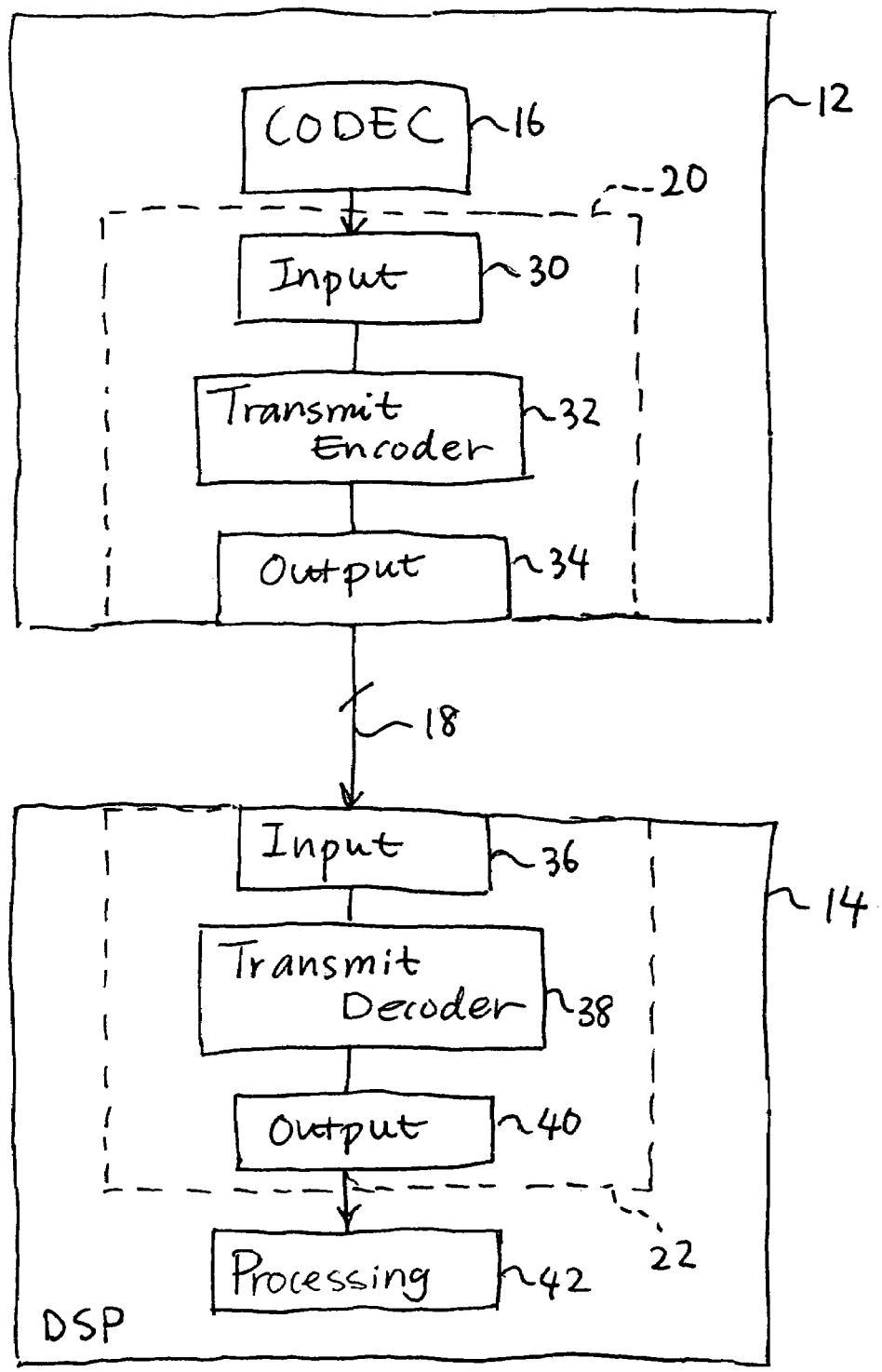
FIG. 4 is a diagram schematically illustrating the interface circuits for transferring digital data between a coder/decoder circuit and a signal processor (DSP) in accordance with one embodiment of the present invention.

FIG. 4 schematically illustrates the interface circuits 20 and 22 for transferring digital data between the coder/decoder circuit 12 and the signal processor (DSP) 14, in accordance with one embodiment of the present invention. The interface circuit 20 includes an input buffer 30 which receives output data from the CODEC 16, a transmit encoder 32 coupled to the input buffer 30, and an output buffer/port 34 coupled to the transmit encoder 32. The output data from the CODEC 16 is a block of data values having certain statistical characteristics. The transmit encoder 32 generates a data stream by encoding the block of data values based on the statistical characteristics thereof, and the data stream is transferred to the DSP 14 through the output buffer/port 34 and the data bus 18.

As shown in FIG. 4, the interface circuit 22 includes an input port/buffer 36 adapted to receive the encoded data stream from the data bus 18, a transmit decoder 38 coupled to the input port/buffer 36, and an output buffer 40 coupled to the transmit decoder 38. The transmit decoder 38 reconstructs the original decoded data stream (i.e., the output from the CODEC 16) by decoding the encoded data stream, and outputs to the output buffer 40. The buffered data is processed, for example, by a processing module 42 of the DSP 14.

Figure 1:
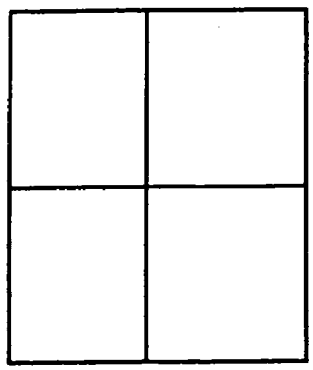
FIG. 1 is a diagram schematically illustrating an example of macroblock data.
Figure 1:
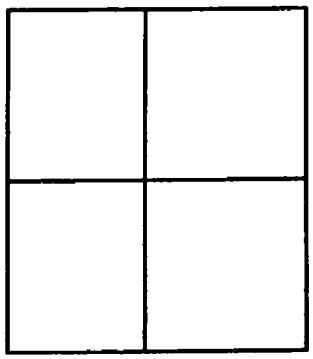
Figure 1:
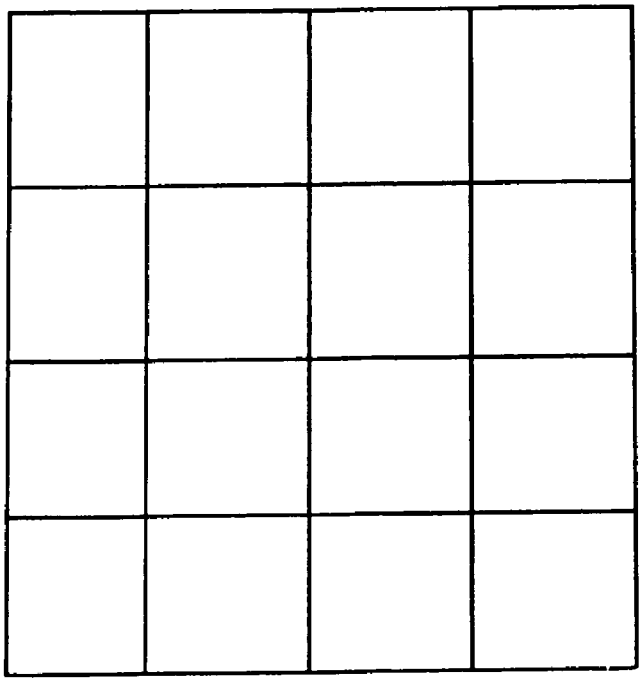

When the CODEC 16 at least partially decodes the encoded data stream 13, the decoded data contains blocks of data values having certain statistical characteristics. For example, when an MPEG-coded video data stream is decoded, the resulting data (i.e., an input to the interface circuit 20) may be a series of macroblock data, as shown in FIG. 1. Since the original video data has been encoded/compressed using a frame-based video compression standard, as described above, the macroblock data has certain statistical characteristics utilized in the data compression scheme. A macroblock is a collection of smaller blocks, for example, 4×4 blocks as shown in FIG. 1, or 8×8 blocks, where the macroblock format and the block size depend on the video compression standard. In the example illustrated in FIG. 1, a macroblock consists of sixteen (16) 4×4 Luma blocks, four (4) 4×4 Cr blocks, and four (4) 4×4 Cb blocks. In the 8×8 block size standard, a macroblock would consist of four (4) 8×8 Luma blocks, one (1) 8×8 Cr block, and one (1) 8×8 Cb block.

Such a 4×4 block, 8×8 block, or other size of block which is used as the unit block in the compression standard is referred to as "a block" in this specification. When the compressed data (bit stream) is decoded/decompressed by the CODEC 16, the data is reconstructed into "a block of data values." Such a block of data values have a certain known statistical characteristics corresponding to the video data compression scheme used. In this specification, the 4×4 block size is used for explanation. It should be noted, however, that the present invention is applicable for any block size, although the 4×4 or 8×8 block sizes are commonly used in the data compression. In addition, the example illustrated in FIG. 1 is based on the 4:2:0 macroblock format. The present invention is also applicable for other macroblock formats such as 4:2:2 and 4:4:4, as is well understood by those of ordinary skill in the art. Furthermore, although the MPEG compression is used for explanation, the present invention is also applicable to other compression schemes such as JPEG, or any other method as long as statistical characteristics of the decompressed data stream to be transferred (to another processor) is known.

In accordance with one embodiment of the present invention, when the MPEG-coded video data is decoded/decompressed by the CODEC 16, the block of data values are quantized DCT coefficient values of the video data. Having already been quantized in the MPEG-compression/encoding process, statistically most of the coefficient values are zero. FIG. 5A schematically illustrates an example of such a block 50 of data values (coefficients) in 4×4 block. Utilizing the specific statistical characteristics of the quantized coefficient values, a significance map which indicates locations of "significant" value is generated for each block of data values. In this example, the significant values are non-zero coefficients, and "non-significant" values are zero coefficients.

More specifically, when blocks of the coefficient data values are to be transmitted to the DSP 14, each block is scanned in a certain order to generate a series of data (a first data series 52). For example, each block is scanned row by row, from the left to the right, from the top to the bottom. The resulting data series 52 is illustrated in FIG. 5B. As shown in FIG. 5C, the significance map 54 has 16 bits, i.e., the number of the coefficient values in the block, and indicates the location of non-zero values in the data series 52 by a bit value "1," and zero values by a bit value "0." This specific example of the significance map 54 (16-bit value) is expressed as e800 in hexadecimal.

Then, the number of bits representing each of the significant values (i.e., non-zero coefficients) in the data series is determined, and a codeword 56 indicating the number of the bits is generated for that data series (corresponding to a block). For example, since almost all coefficients are very small, eight (8) bits would be sufficient for most of the blocks, and 16 bits are only rarely necessary. The actual non-zero coefficient values 58 in the series follow the codeword. Accordingly, an output data series (second data series 60) includes the significance map 54, the codeword 56, and the significant values (non-zero coefficients) 58, as shown in FIG. 5D. The second data series 60 is then combined with other information (such as macroblock information), if necessary, and transmitted to the DSP 14 via the data bus 18. At the DSP 14, the interface circuit 22 receives the second data series 60, and reconstructs the first data series 52 based on the significance map 54, the codeword 56, and the significant values 58.

Alternatively, instead of using the codeword 56, it may be assumed that all coefficient values can be represented with eight (8) bits for all of the blocks, and a special "escape codeword" may be inserted preceding a specific coefficient value which requires sixteen (16)-bit representation. FIG. 6A illustrates such a 4×4 block 62 having a large coefficient value. FIGS. 6B through 6D illustrate the corresponding first data series 63, significance map 64, and output data series (second data series 65) including the significance map 64, significant (non-zero coefficient) values 66, and the escape codeword 67 ("80" in hexadecimal in this example), respectively. The second data series 65 is then combined with other information, if necessary, and transmitted to the DSP 14 via the data bus 18. At the DSP 14, the interface circuit 22 receives the second data series 65, and reconstructs the first data series 63 based on the significance map 64, the escape codeword 67, and the significant values 66.

Figure 7:
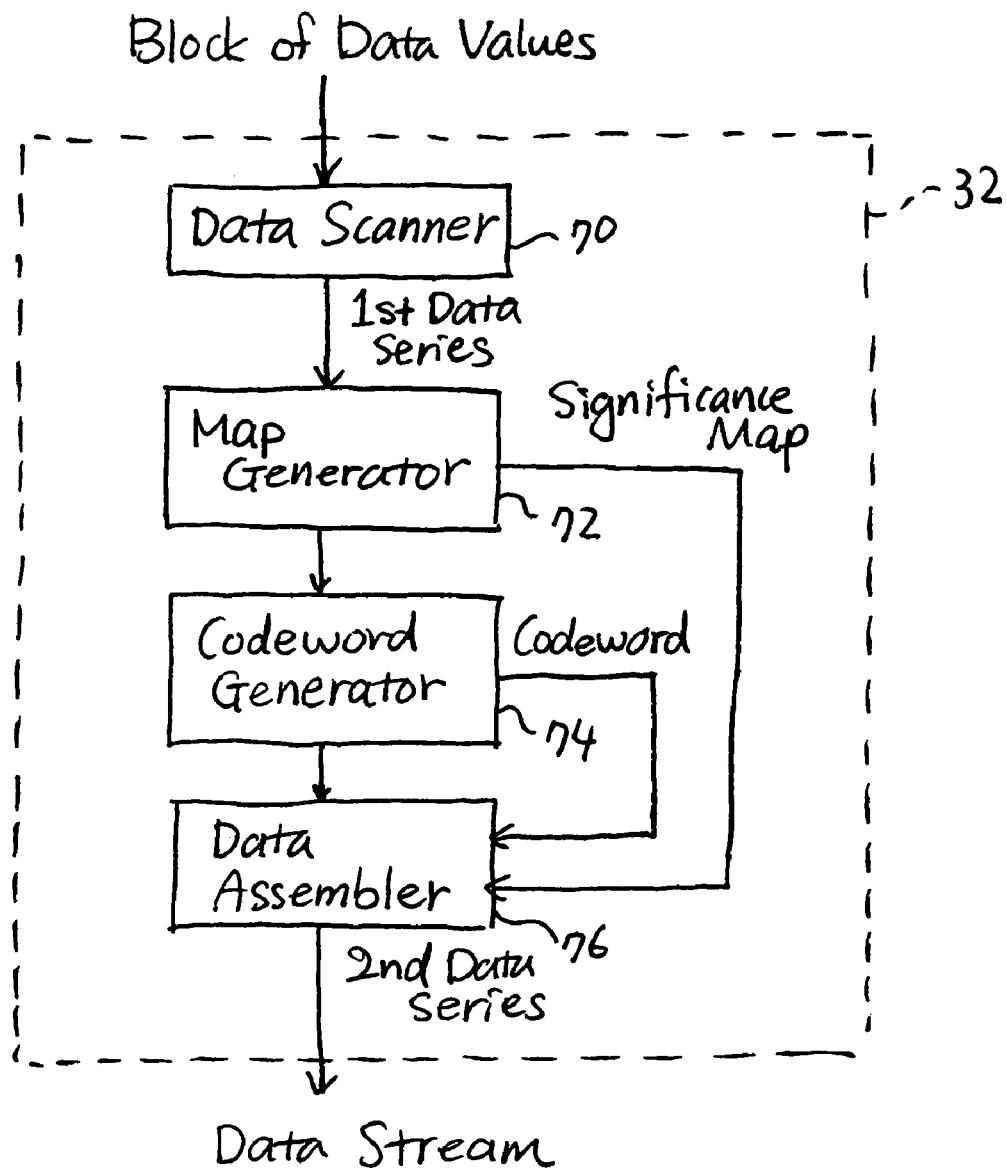
FIG. 7 is a diagram schematically illustrating an example of a transmit encoder of the interface circuit in accordance with one embodiment of the present invention.

FIG. 7 schematically illustrates an example of the transmit encoder 32 of the interface circuit 20 in accordance with one embodiment of the present invention. As shown in FIG. 7, the transmit encoder 32 includes a data scanner 70, a map generator 72, a codeword generator 74, and a data assembler 76. The data scanner 70 scans the block of data values (such as 50), which may be in the input buffer 30 (FIG. 4), in a certain order and produces the first data series (such as 52). As described above, the data values include significant values (non-zero coefficient values) and non-significant values (zero coefficient values), where the number of significant values is statistically smaller than the number of the non-significant values (for example, most of the coefficients values are zero). The map generator 72 generate the significance map (such as 54) indicating the locations of the significant values in the first data series. For example, the significance map has the same number of bits, where each bit corresponding to one of the data values in the block. The codeword generator 74 determines the number of bits representing each of the significant values in the first data series, and generates a codeword (such as 56) indicating the number of bits. That is, a codeword is generated for each block. The data assembler 76 generates the second data series (such as 60) including the significance map, the codeword, and the significant values. The second data series is sent to the output buffer/port 34 (FIG. 4).

In an embodiment corresponding to FIGS. 6A through 6D, the codeword generator 74 and the data assembler 76 may operate in a slightly different manner as described below. In this embodiment, it is assumed that all of the significant values of all blocks can be represented by a certain predetermined number of bits (for example, 8 bits), and only when a specific data value requires bits greater than the predetermined number, an escape codeword is inserted just before the specific significant value.

After the block of data value is scanned and a significance map is generated, the codeword generator 74 determines the number of bits representing each of the significant values in the series, and if the number of bits determined for a particular significant value exceeds the predetermined number, it generates an escape codeword indicating the number of bits representing the particular significant value. Then, the data assembler 76 generates the second data series including the significance map, the escape codeword if necessary, and the significant values. The escape codeword, if necessary, is inserted in front of the particular significant value which needs more bits than the predetermined number.

As described in the embodiments above, the known statistical characteristics of the original data stream of decoded data are utilized in order to compress the original decoded data stream before being transferred to another processor within a multi-processor system. In accordance with one embodiment of the present invention, a run-length coding, which also utilizes the known statistical characteristics of the original data stream, is used for such data compression for data transfer between processors. The significance map described in the embodiments above does not depend on a specific order of scanning because each value in a block is assigned with a respective bit. In the run-length coding, on the other hand, the statistical characteristics of the data values dictates the order of scanning.

FIGS. 8A through 8C illustrate an example of such run-length coding in accordance with one embodiment of the present invention. As shown in FIG. 8A, the same 4×4 block of data values (coefficient values) 50 is used as an example. Similarly to the previous embodiments, the block of data values 50 is scanned in a certain order to produce a first data series. In this embodiment, however, the coefficient values are scanned in a zigzag order to maximize the runs of zeros (i.e., the non-significant values), resulting in the first data series 80 (FIG. 8 B). A run-length value is determined for each of the significant values (i.e., non-zero coefficient values), where the run-length value indicates the number of zeros preceding the significant value in the first data series 80. For example, the first non-zero coefficient value "5" does not have any preceding zeros, so the run-length value is zero. This is the same for the second non-zero coefficient value "3." The third non-zero coefficient value "1" has one preceding zero, thus the run-length value for coefficient value "1" is one. Then, the determined run-length values are associated with the corresponding significant values to produce data pairs, for example, (0, 5), (0, 3), (1, 1), and the like. The second data series 82 is generated such that it includes the data pairs in the order of the significant values in the first data series 80, followed by and an end-of-data (EOD) codeword, as shown in FIG. 8C. When received by the interface circuit 22 (FIG. 3), the first data series 80 is reconstructed from second data series 82 based on the data pairs and the EOD codeword.

Figure 9:
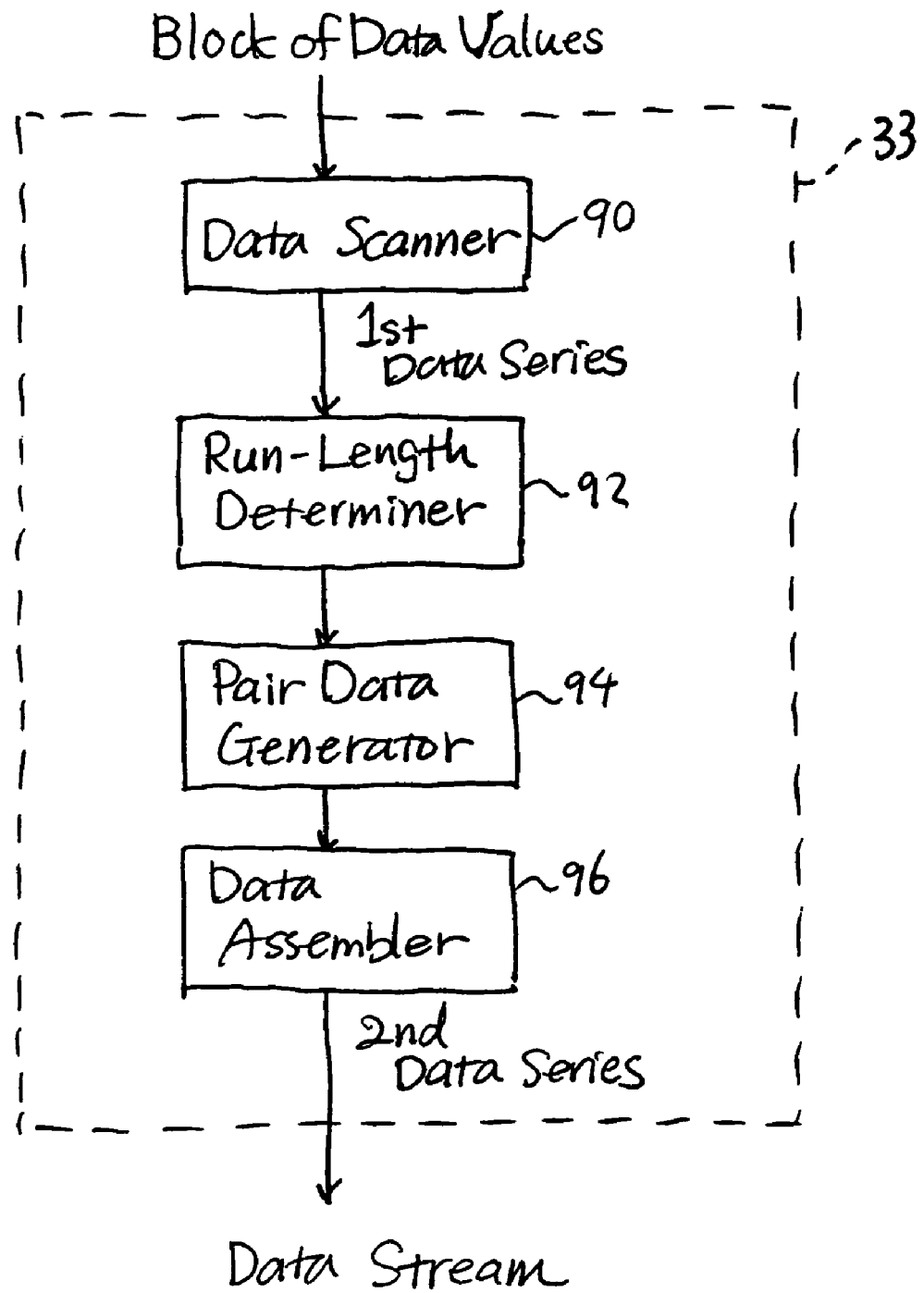
FIG. 9 is a diagram schematically illustrating an example of an transmit encoder in the interface circuit in accordance with one embodiment of the present invention corresponding to FIGS. 8A-8C.

FIG. 9 schematically illustrates an example of the transmit encoder 33 in the interface circuit 20 in accordance with one embodiment of the present invention corresponding to FIGS. 8A-8C. The transmit encoder 33 includes a data scanner 90, a run-length determiner 92, a pair data generator 94, and a data assembler 96 as shown in FIG. 9. The data scanner 90 scans the block of data values (such as 50) in a certain order and produces a first data series. In this embodiment, the statistical characteristics that the significant values (non-zero coefficient values) not only substantially outnumber the non-significant values (zero coefficient values), but also have specific statistical arrangement (locations) in the data block are utilized to produce the second (compressed) data series, as described above. The run-length determiner 92 determines a run-length value for each significant value, as described above, and the pair-data generator 94 associates the run-length values with the corresponding significant values to produce data pairs. The data assembler 96 generates the second data series including the data pairs in an order of the significant values in the first data series, and an end-of-data (EOD) codeword. The second data series is sent to the output buffer/port 34 so as to be transferred via the data bus 18 (see FIG. 4).

Referring back to FIG. 4, the second data series (such as 60, 65, 82) is received by the interface circuit 22 at the input port/buffer 36. The transmit decoder 38 reconstruct the first data series from the second data series in accordance with the compression method used in the corresponding transmit encoder 32 or 33. For example, zeros are inserted in the locations specified by the significance map or the run-length values.

Referring back to FIG. 3, the present invention is also applicable to data transfer between the DSP 14 and a coder/decoder circuit 15 via a data bus 28. The DSP 14 typically re-quantizes the video data after it processes the video data (for example, preprocessing), and sends the quantized data to the coder/decoder circuit 15 for the MPEG-encoding/compression. Thus, in this embodiment, the coder/decoder circuit 15 is an encoder. Similarly to the coder/decoder circuit 12, the coder/decoder circuit 15 may be implemented using a field programmable gate array (FPGA) which includes a CODEC 17 such as CABAC, CAVLC, or the like. The coder/encoder 15 outputs an encoded data stream 19, for example, an MPEG-coded video data stream.

Such a pre-encoding/compression data stream also requires a very high data transfer rate. Accordingly, in accordance with one embodiment of the present invention, interface circuits 24 and 26 are provided to the DSP 14 and the coder/decoder circuit 15, respectively, for efficient data transmission via the data bus 28. As shown in FIG. 3, the interface circuit 24 may be implemented as part of the DSP 14 and the interface circuit 26 may be implemented as part of the coder/decoder circuit 15 (using the FPGA). The interface circuit 24 encodes/compress a data stream having certain statistical characteristics specific to the encoding scheme used, for example, a quantized data values. The interface circuit 26 receives the data thus encoded/compressed and reconstruct the original data stream (for example, the quantized data values) for the CODEC 17.

The structure and function of the interface circuits 24 and 26 are substantially the same as that of the interface circuits 20 and 22, respectively, and will be well understood by those of ordinary skill in the art from the description above without further explanation.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for transferring digital data between a coder/decoder circuit and a signal processor, said method comprising:
    obtaining, at a first circuit, a block of data values having certain statistical characteristics, the first circuit being one of the coder/decoder circuit and the signal processor;
    generating, at the first circuit, a data stream by encoding the block of data values based on the statistical characteristics thereof;
    transferring the data stream to a second circuit via a data bus connecting the first circuit and the second circuit, the second circuit being the other of the coder/decoder circuit and the signal processor; and
    reconstructing, at the second circuit, the block of data values by decoding the data stream received from the first circuit,
    wherein said generating includes:
        scanning the block of data values in a certain order to produce a first data series, the data values including significant values and non-significant values, a number of significant values being statistically smaller than a number of the non-significant values;
        generating a significance map indicating locations of the significant values in the first data series;
        determining a number of bits representing each of the significant values in the first data series and generating a codeword indicating the number of bits; and
        generating a second data series including the significance map, the codeword, and the significant values, the second data series being the data stream to be transferred.

2. The method of claim 1, wherein said obtaining includes:
    receiving a compressed data stream at the first circuit; and
    at least partially decompressing the compressed data stream to reconstruct the block of the data values.

3. The method of claim 1, wherein the block of data values are quantized coefficient values of video data.

4. The method of claim 1, wherein the coder/decoder circuit is a field programmable gate away (FPGA), and the signal processor is a digital signal processor (DSP).

5. The method of claim 1, wherein said reconstructing includes:
    reconstructing the first data series based on the significance map, the codeword, and the significant values.

6. The method of claim 1, wherein the data values are quantized coefficient values of video data, the significant values are non-zero coefficient values, and the non-significant values are equal to zero (0).

7. A method for transferring digital data between a coder/decoder circuit and a signal processor, said method comprising:
    obtaining, at a first circuit, a block of data values having certain statistical characteristics, the first circuit being one of the coder/decoder circuit and the signal processor;
    generating, at the first circuit, a data stream by encoding the block of data values based on the statistical characteristics thereof;
    transferring the data stream to a second circuit via a data bus connecting the first circuit and the second circuit, the second circuit being the other of the coder/decoder circuit and the signal processor; and
    reconstructing, at the second circuit, the block of data values by decoding the data stream received from the first circuit,
    wherein said generating includes:
        scanning the block of data values in a certain order to produce a first data series, the data values including significant values and non-significant values, a number of significant values being statistically smaller than a number of the non-significant values;
        generating a significance map indicating locations of the significant values in the first data series;
        determining a number of bits representing each of the significant values in the series;
        generating, if the number of bits determined for a particular significant value exceeds a predetermined number, an escape codeword indicating the number of bits representing the particular significant value; and
        generating a second data series including the significance map and the significant values, the escape codeword, if any, being inserted in front of the particular significant value in the second data series, the second data series being the data stream to be transferred.

8. The method of claim 7, wherein said reconstructing includes:
    reconstructing the first data series based on the significance map, the escape codeword, if any, and the significant values.

9. The method of claim 7, wherein the data values are quantized coefficient values of video data, the significant values are non-zero coefficient values, and the non-significant values are equal to zero (0).

10. A method for transferring digital data between a coder/decoder circuit and a signal processor, said method comprising:
    obtaining, at a first circuit, a block of data values having certain statistical characteristics, the first circuit being one of the coder/decoder circuit and the signal processor;
    generating, at the first circuit, a data stream by encoding the block of data values based on the statistical characteristics thereof;
    transferring the data stream to a second circuit via a data bus connecting the first circuit and the second circuit, the second circuit being the other of the coder/decoder circuit and the signal processor; and
    reconstructing, at the second circuit, the block of data values by decoding the data stream received from the first circuit,
    wherein said generating includes:
        scanning the block of data values in a certain order to produce a first data series, the data values including significant values and non-significant values, a number of significant values being statistically smaller than a number of the non-significant values;

determining a run-length value for each significant value, the run-length value indicating a number of preceding non-significant values preceding the significant value in the first data series;

associating the run-length values with the corresponding significant values to produce data pairs; and generating a second data series including the data pairs in an order of the significant values in the first data series, and an end-of-data (EOD) codeword, the second data series being the data stream to be transferred.

11. The method of claim 10, wherein said reconstructing includes:

reconstructing the first data series based on the data pairs and the EOD codeword.

12. The method of claim 10, wherein the data values are quantized coefficient values of video data, the significant values are non-zero coefficient values, and the non-significant values are equal to zero (0).

13. An interface circuit for transferring digital data between a coder/decoder circuit and a signal processor, said interface circuit comprising:

an input buffer adapted to receive a block of data values at a first circuit, the block of data values having certain statistical characteristics, the first circuit being one of the coder/decoder circuit and the signal processor;

a transmit encoder coupled to said input buffer, adapted to generate a data stream by encoding the block of data values based on the statistical characteristics thereof; and an output port/buffer coupled to said transmit encoder, adapted to transfer the data stream to a second circuit via a data bus connecting the first circuit and the second circuit, the second circuit being the other of the coder/decoder circuit and the signal processor, wherein said transmit encoder includes:

a data scanner adapted to scan the block of data values in a certain order to produce a first data series, the data values including significant values and non-significant values, a number of significant values being statistically smaller than a number of the non-significant values;

a map generator adapted to generate a significance map indicating locations of the significant values in the first data series;

a codeword generator adapted to determine a number of bits representing each of the significant values in the first data series and generating a codeword indicating the number of bits; and a data assembler adapted to generate a second data series including the significance map, the codeword, and the significant values, the second data series being the data stream to be transferred.

14. The interface circuit of claim 13, wherein said block of data values are obtained by at least partially decompressing a compressed data stream received at the first circuit.

15. The interface circuit of claim 13, wherein the block of data values are quantized coefficient values of video data.

16. The interface circuit of claim 13, wherein the data values are quantized coefficient values of video data, the significant values are non-zero coefficient values, and the non-significant values are equal to zero (0).

17. An interface circuit for transferring digital data between a coder/decoder circuit and a signal processor, said interface circuit comprising:

an input buffer adapted to receive a block of data values at a first circuit, the block of data values having certain statistical characteristics, the first circuit being one of the coder/decoder circuit and the signal processor;

a transmit encoder coupled to said input buffer, adapted to generate a data stream by encoding the block of data values based on the statistical characteristics thereof; and an output port/buffer coupled to said transmit encoder, adapted to transfer the data stream to a second circuit via a data bus connecting the first circuit and the second circuit, the second circuit being the other of the coder/decoder circuit and the signal processor, wherein said transmit encoder includes:

a data scanner adapted to scan the block of data values in a certain order to produce a first data series, the data values including significant values and non-significant values, a number of significant values being statistically smaller than a number of the non-significant values;

a map generator adapted to generate a significance map indicating locations of the significant values in the first data series;

a codeword generator adapted to determine a number of bits representing each of the significant values in the series, and generate, if the number of bits determined for a particular significant value exceeds a predetermined number, an escape codeword indicating the number of bits representing the particular significant value; and a data assembler adapted to generate a second data series including the significance map and the significant values, the escape codeword, if any, being inserted in front of the particular significant value in the second data series, the second data series being the data stream to be transferred.

18. The interface circuit of claim 17, wherein the data values are quantized coefficient values of video data, the significant values are non-zero coefficient values, and the non-significant values are equal to zero (0).

19. An interface circuit for transferring digital data between a coder/decoder circuit and a signal processor, said interface circuit comprising:

an input buffer adapted to receive a block of data values at a first circuit, the block of data values having certain statistical characteristics, the first circuit being one of the coder/decoder circuit and the signal processor;

a transmit encoder coupled to said input buffer, adapted to generate a data stream by encoding the block of data values based on the statistical characteristics thereof; and an output port/buffer coupled to said transmit encoder, adapted to transfer the data stream to a second circuit via a data bus connecting the first circuit and the second circuit, the second circuit being the other of the coder/decoder circuit and the signal processor, wherein said transmit encoder includes:

a data scanner adapted to scan the block of data values in a certain order to produce a first data series, the data values including significant values and non-significant values, a number of significant values being statistically smaller than a number of the non-significant values;

a run-length determiner adapted to determine a run-length value for each significant value, the run-length value indicating a number of preceding non-significant values preceding the significant value in the first data series;

a pair-data generator, adapted to associate the run-length values with the corresponding significant values to produce data pairs; and a data assembler adapted to generate a second data series including the data pairs in an order of the significant values in the first data series, and an end-of-data (EOD) codeword, the second data series being the data stream to be transferred.

20. The interface circuit of claim 19, wherein the data values are quantized coefficient values of video data, the significant values are non-zero coefficient values, and the non-significant values are equal to zero (0).

21. An apparatus for transferring digital data between a coder/decoder circuit and a signal processor, said apparatus comprising:

means for receiving a block of data values obtained in a first circuit, the block of data values having certain statistical characteristics, the first circuit being one of the coder/decoder circuit and the signal processor;

means for generating, at the first circuit, a data stream by encoding the block of data values based on the statistical characteristics thereof;

means for transferring the data stream to a second circuit via a data bus connecting the first circuit and the second circuit, the second circuit being the other of the coder/decoder circuit and the signal processor; and means for reconstructing, at the second circuit, the block of data values by decoding the data stream received from the first circuit, wherein said means for generating includes:

means for scanning the block of data values in a certain order to produce a first data series, the data values including significant values and non-significant values, a number of significant values being statistically smaller than a number of the significant values;

means for generating a significance map indicating locations of the significant values in the first data series;

means for determining a number of bits representing each of the significant values in the first data series and generating a codeword indicating the number of bits; and means for generating a second data series including the significance map, the codeword, and the significant values, the second data series being the data stream to be transferred.

22. An apparatus for transferring digital data between a coder/decoder circuit and a signal processor, said apparatus comprising:

means for receiving a block of data values obtained in a first circuit, the block of data values having certain statistical characteristics, the first circuit being one of the coder/decoder circuit and the signal processor;

means for generating, at the first circuit, a data stream by encoding the block of data values based on the statistical characteristics thereof;

means for transferring the data stream to a second circuit via a data bus connecting the first circuit and the second circuit, the second circuit being the other of the coder/decoder circuit and the signal processor; and means for reconstructing, at the second circuit, the block of data values by decoding the data stream received from the first circuit, wherein said means for generating includes:

means for scanning the block of data values in a certain order to produce a first data series, the data values including significant values and non-significant values, a number of significant values being statistically smaller than a number of the significant values;

means for generating a significance map indicating locations of the significant values in the first data series;

means for determining a number of bits representing each of the significant values in the series;

means for generating, if the number of bits determined for a particular significant value exceeds a predetermined number, an escape codeword indicating the number of bits representing the particular significant value; and means for generating a second data series including the significance map and the significant values, the escape codeword, if any, being inserted in front of the particular significant value in the second data series, the second data series being the data stream to be transferred.

23. An apparatus for transferring digital data between a coder/decoder circuit and a signal processor, said apparatus comprising:

means for receiving a block of data values obtained in a first circuit, the block of data values having certain statistical characteristics, the first circuit being one of the coder/decoder circuit and the signal processor;

means for generating, at the first circuit, a data stream by encoding the block of data values based on the statistical characteristics thereof;

means for transferring the data stream to a second circuit via a data bus connecting the first circuit and the second circuit, the second circuit being the other of the coder/decoder circuit and the signal processor; and means for reconstructing, at the second circuit, the block of data values by decoding the data stream received from the first circuit, wherein said means for generating includes:

means for scanning the block of data values in a certain order to produce a first data series, the data values including significant values and non-significant values, a number of significant values being statistically smaller than a number of the significant values;

means for determining a run-length value for each significant value, the run-length value indicating a number of preceding non-significant values preceding the significant value in the first data series;

means for associating the run-length values with the corresponding significant values to produce data pairs; and means for generating a second data series including the data pairs in an order of the significant values in the first data series, and an end-of-data (EOD) codeword, the second data series being the data stream to be transferred.

* * * * *